United States Patent [19]
Bakewell

[11] 3,823,626
[45] July 16, 1974

[54] METHOD OF AND APPARATUS FOR MACHINING CURVED SURFACES

[75] Inventor: John Bakewell, Warwick, England

[73] Assignee: GKN Transmission Limited, Birmingham, England

[22] Filed: May 30, 1973

[21] Appl. No.: 365,192

[30] Foreign Application Priority Data
May 30, 1972 Great Britain............... 25169/72

[52] U.S. Cl........................ 82/1 C, 82/18, 408/54
[51] Int. Cl........................ B23b 3/00, B23b 3/28
[58] Field of Search.......... 82/1, 1.3, 18, 19; 408/54

[56] References Cited
UNITED STATES PATENTS

| 167,614 | 9/1875 | Koch et al. | 82/18 |
| 1,755,349 | 4/1930 | Casse | 82/18 |
| 2,870,578 | 1/1959 | Baier | 82/18 X |
| 3,494,388 | 2/1970 | Sanders et al. | 82/18 |
| 3,593,603 | 7/1971 | Gellert | 82/18 |

*Primary Examiner*—Harrison L. Hinson
*Attorney, Agent, or Firm*—Spencer & Kaye

[57] ABSTRACT

An appparatus for forming a machined epitrochoidal surface comprising a body structure supporting an orbitally movable carrier constrained to an epitrochoidal orbit determined by the meshing of a stationary base gear and an orbital gear of annular form driven by an eccentric, at least one tool holder being driven by the carrier along an epitrochoidal path while the angular relationship between a working face of the tool and the path along which it is moved is determined by a guide member carried round with the assembly of carrier, driving eccentric, and tool holder and having engagement with this assembly at two locations, the first of which is coaxial with a moving instantaneous centre defined by the point of contact or meshing between the base and orbiting gears, and the other of which is coaxial with a pivotal axis about which the tool holder can move and which passes through the point of engagement between the working face of the tool and a workpiece, slide and slideway means being provided in association with the guide member at one of these locations to enable the carrier to accommodate the changing distance between said two locations.

20 Claims, 9 Drawing Figures

METHOD OF AND APPARATUS FOR MACHINING CURVED SURFACES

BACKGROUND OF THE INVENTION

Field of the Invention

This invention relates to a method of and apparatus for forming surfaces by machining, such surfaces forming boundaries defined by the locus of a point on a rolling body (herein called the orbiting body) which rolls without slipping around the surface presented by another body (herein called the base body), each such body presenting a contact surface for engagement with the other body of continuous curved form. Such surfaces are herein referred to as being of the kind specified.

The invention has been developed in relation to the requirement to form, by machining, a surface of epitrochoidal form. Such surface is required to be presented by the internal surface of a chamber of a rotary piston engine such as that commonly known as the Wankel engine. In this case the form of epitrochoidal surface is one which incorporates two lobes and is generated when both the rotary bodies are of circular form with the orbiting body presenting an external contact surface having a diameter which is half that of the base body, or being of annular form and presenting an internal contact surface in which case it has a diameter which is the ratio of 3 : 2 with respect to the diameter of the base body.

It will, however, be understood that the invention is not limited to a method of and apparatus for forming machined surfaces of two lobed epitrochoidal form but may be employed generally for the formation by machining of any surface of the kind specified generated by base and orbiting rolling bodies as aforesaid in which the dimensions of these bodies are such that the lobes occupy constant positions relative to the base body so that the same surface is traced out in each of a plurality of orbiting cycles.

SUMMARY OF THE INVENTION

From one aspect the present invention resides in a method of forming a surface on a workpiece by machining comprising moving a carrier on which a machining tool is supported in a mode defined by rolling without slipping of an orbiting body around a base body such that the orbiting body moves angularly about an instantaneous centre at a point of contact between the bodies to move the tool along a predetermined link path in each complete cycle of movement of the tool, controlling the angular relationship at a point of engagement of the tool with the workpiece between the path of movement of the tool and a working face of the tool by controllably moving the tool angularly with respect to the carrier in a plane parallel to that in which the carrier moves.

It would be within the scope of the invention for the angular relationship aforesaid to vary at different positions along the path traced out by the tool and such a requirement could arise for any of a number of reasons, for example to achieve optimum machining conditions in respect of portions of the surface having different curvatures. In the ordinary practice of the invention, however, it is satisfactory to maintain constant angular relation between the path of movement of the tool and the reference radius drawn from the instantaneous centre to the point of engagement between the tool and the workpiece.

From a further aspect the invention resides in the provision of an apparatus for forming a machined surface on the workpiece, such apparatus comprising a body structure, carrier means movably mounted on said body structure, a machining tool supported from said carrier means, means constraining said carrier means to movement along a path defined by the locus of a point on an orbiting body in rolling non-slipping engagement with a base body and rotatable therearound, drive means for moving said carrier means along said path, and means for controllably varying the angular relationship between said tool and said carrier means in a plane parallel to that in which said carrier means is moved and during movement of said carrier means along said path.

In the form of apparatus intended for normal practice of the method, the apparatus may include a tool holder mounted for angular movement relatively to the carrier, and means for controlling the angular relationship between the tool holder and the carrier parallel to the plane of movement of the latter in such a manner that the tool holder has a constant angular relation to a reference axis passing through a moving instantaneous centre of rotation of the carrier defined by the point of contact between the base and orbiting bodies and the point of engagement of the tool and the workpiece.

BRIEF DESCRIPTION OF THE DRAWINGS

The invention is illustrated in the accompanying drawings wherein:

Referring to FIGS. 1 and 2, the method of the invention therein illustrated is applied to the machining of a surface on a workpiece 2 by means of a non-rotating machining tool 3. The line 1 represents both the surface to be formed and the path of movement of the tool, and is a form of trochoid, namely a two-lobed epitrochoid and the tool 3 is moved along a path corresponding to the shape of this surface by mounting it on a carrier 4a, the motion of which is derived by rolling circular body 4 in the direction of arrow 4d without slipping around a fixed base body 5. The carrier 4a is shown diagrammatically fixed to the body 4. To produce a two-lobed epitrochoid the ratio of diameters of the bodies 4 and 5 is 3 : 2. The invention may be applied, however, to the production of other trochoidal surfaces in which the ratio of diameters of the generating orbital body and base body such as 4 and 5 is selected to produce the required number of lobes occupying fixed angular positions relatively to the base body 5.

Figure 1:
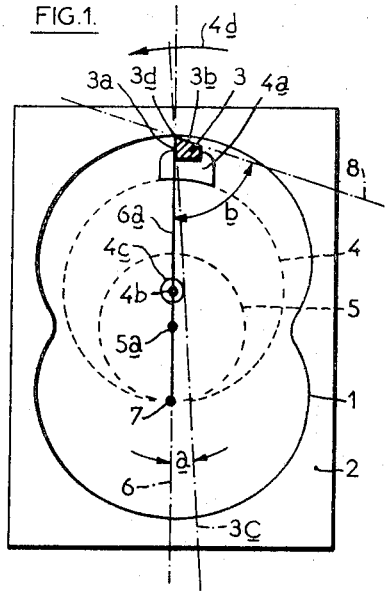
FIGS. 1 and 2 are diagrams illustrating the method of the invention and showing the geometrical relationships between a non-rotating cutting tool, path of movement traced out thereby, and base and orbiting bodies of circular form generating such path.

The tool 3 has a leading principal working face 3a intersecting an outer or trailing face 3b to define a cutting edge which engages the surface of the workpiece and removes metal therefrom. Initially the workpiece would typically be in the form of a casting of metal or other material having an internal surface shaped approximately in conformity with the surface 1 to be produced with the aperture presented by the workpiece of smaller size so that a layer of metal or material has to be removed.

For efficient removal of the metal or material a predetermined angular relationship must be maintained between the face of the workpiece which determines or controls its cutting action, namely the principal working face 3a, and the direction of movement of the tool which at any given instant is tangential to the path 1. This angular relation may thus alternatively be identified as that represented by the angle a between a line 3c coincident with the plane of the working face 3a and drawn parallel to the plane of movement of the tool and a reference axis represented by the dash and dot line 6 drawn through the point of engagement of the cutting edge of the tool with the surface of the workpiece and through the instantaneous centre 7 about which the tool moves in tracing out the path 1. The point 7 is the point of engagement between the orbiting and base bodies 4 and 5. Further, the clearance angle between the outer or trailing face 3b and a tangent drawn to the path 1 at the point of engagement 3d between the cutting edge of the tool and the workpiece should likewise be maintained at a predetermined value although this is less critical than the angle a and is conveniently represented by the angle b between the reference axis 6 and a line 8 lying in the plane of the face 3b and drawn parallel to the plane of movement of the tool.

In many instances the predetermined angle a and the predetermined angle b will be required to be maintained constant throughout the travel of the tool 3 along the path 1.

It would, however, be within the scope of the invention for the angle a and the angle b to be varied in a predetermined manner if desired with respect to progression of the tool along the surface to execute a complete cycle of movement therealong.

In the usual case, however, where the angle a and the angle b are both maintained constant, this is achieved by supporting the tool 3 for angular movement relatively to a carrier on which it is mounted about an axis normal to the plane of movement and passing through the point 3d, and by controlling the angular movement about the point 3d by a guide means represented diagrammatically by full line 6a. The guide means 6a is engaged with the assembly of carrier, drive means therefor, and a tool holder at two locations. The first location is coaxial with the instantaneous centre 7 and engagement is by way of a pivot. The second location is coaxial with the point 3d and engagement is by way of a guideway and slide respectively on the guide means and tool holder. The slide on the tool holder controls the angular position of the tool holder, and hence tool, about the point 3d by cooperation with the guideway, the direction of which is constant relative to the reference axis 6, e.g., parallel thereto. The guideway and slide engagement ensures that the guide means 6a can absorb or accommodate itself to the changing distance between point 3d and the instantaneous centre 7 as the carrier revolves so that it does not impede the tool in tracing out the path 1 but serves to control the angular position of the tool.

The drive means for rotating the orbiting body 4 and the carrier therewith about the base body 5 may conveniently be in the form of an eccentric element having a shaft or journal portion rotatable about the centre 5a of the base body and having an eccentric portion such as a crank pin engaged with the carrier. The throw of the eccentric is equal to the distance between the centre 5a of the base body and the centre 4b of the orbiting body, and the crank pin or eccentric element 4c is thus coaxial with 4b.

Figure 2:
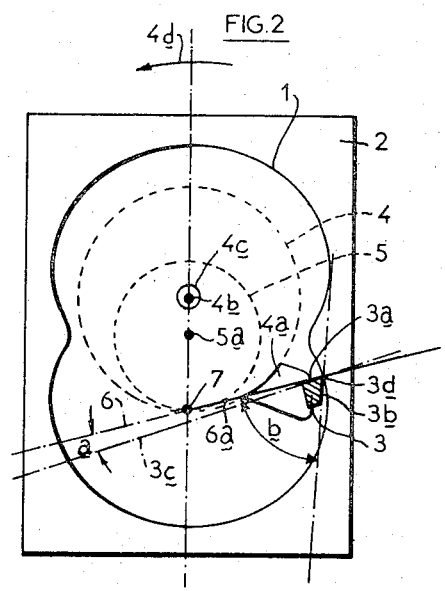

FIG. 2 illustrates the position of the tool and the relationship between the reference axis 6 and the line 3c after two revolutions of the drive eccentric element, it being understood that three complete revolutions of the latter will bring the tool back to the datum or starting position illustrated in FIG. 1.

Figure 3:
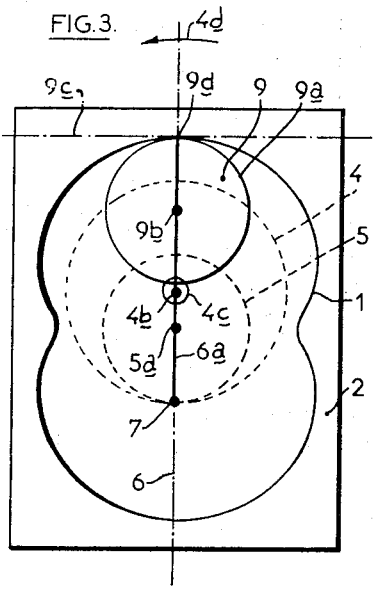
FIGS. 3 and 4 are similar diagrams illustrating the method of the invention as applicable to a rotating machining tool.

In FIG. 3 parts corresponding to those already described are designated by like reference numerals and the preceding description is to be deemed to apply, the following description being confined to differences involved in the performance of the method when utilising a rotary machining tool 9 which may be either a grinding wheel having a radially outwardly presented working surface 9a or a radially outwardly presented working surface constituted by radially projecting teeth as in the case of a milling cutter. Such rotary cutting tool is driven rotatably about its own axis 9b at any suitable speed, as well as being moved along a path 1 corresponding to the surface to be machined. In this Figure the carrier 4a is omitted for clarity.

In this case the angular relationship which is required to be controlled is that presented between the path 1 along which the tool 9 is moved and the working surface of the tool itself 9a at the point of contact 9d between the tool and workpiece. In fact both the path of movement 1 and the working surface 9a at the point of contact 9d can be represented by tangents drawn at this point, and the commonly required angular relation is that these tangents shall be coincident with each other and are, therefore, represented by a single line 9c passing through the point of contact. An alternative representation of this geometrical relationship is that the point of contact 9d, the centre of rotation 9b of the tool 9, and the instantaneous centre 7 shall be maintained colinear with each other throughout movement of the tool 9 along the path conforming to the surface 1.

To achieve this a tool holder for the rotary tool 9 is supported from the carrier through the intermediary of the guide means 6a again represented by a full line which is angularly movable relatively to the carrier about an axis which is normal to the plane of movement of the carrier and passes through the point of contact 9d. The guide means 6a and hence the tool holder is maintained in an angular position relative to the carrier such as to keep the centre of rotation 9b always on the reference axis 6 represented by a dash and dot line. The guide means has a pivotal engagement at a first location with the carrier, namely at point 9d, and has engagement by way of a guideway and slide at a second location, the slide lying on the axis of instantaneous centre 7. It will be understood that it would be within the scope of the invention to adopt some other angular relationship in which a line joining the point of contact 9d and the centre of rotation 9b of the tool is not necessarily coincident with the reference axis but is, for example, maintained at a constant angle thereto or at an angle varying in some predetermined manner with progression of the tool 9 along the path 1.

Figure 4:
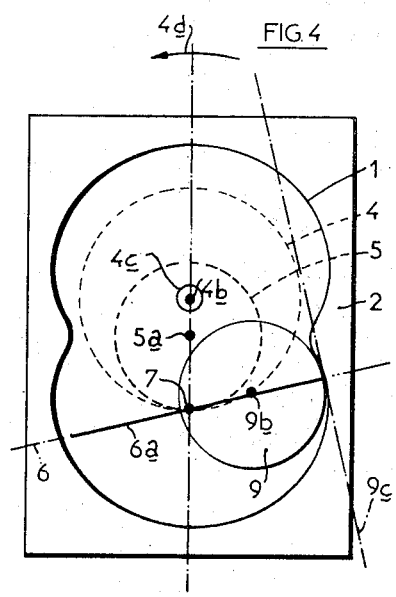

The carrier may, as before, be driven by an eccentric element 4b and FIG. 4 represents the positions of the rotary machining tool after two complete revolutions of the eccentric element from the datum or starting position illustrated in FIG. 3.

Figure 5:
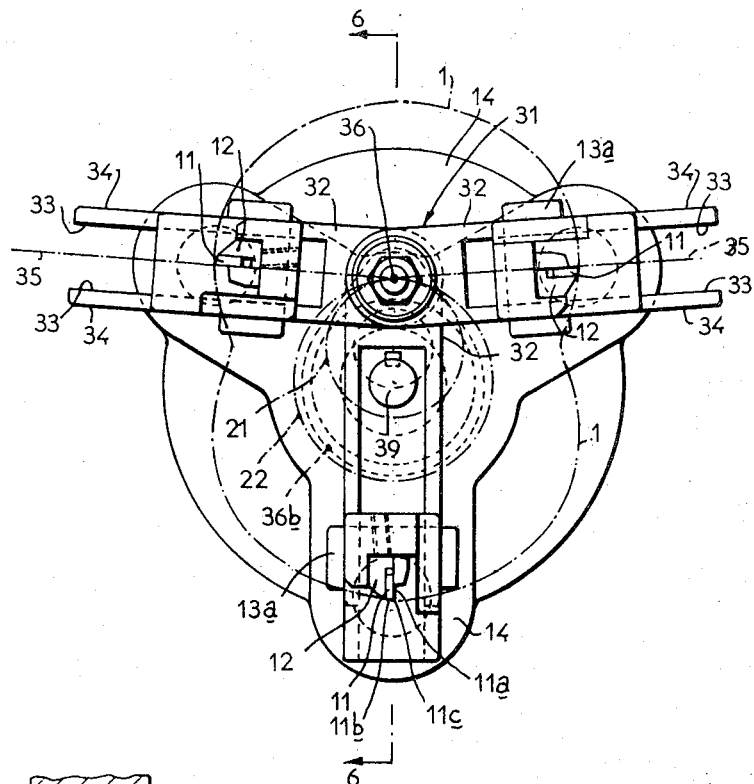
FIG. 5 is a view in end elevation of one embodiment of apparatus in accordance with the invention for carrying out the method thereof using a non-rotating machining tool.
Figure 6:
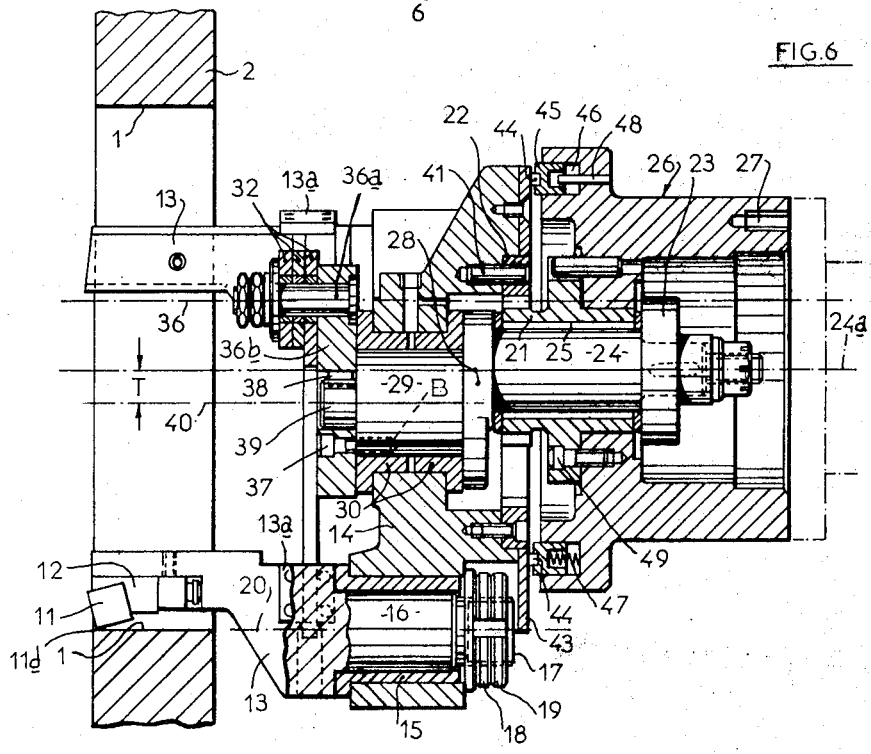
FIG. 6 is a view in side elevation of the same apparatus in cross-section on the line 6—6 of FIG. 5.

Referring now to the embodiment of apparatus for carrying out the method illustrated in FIGS. 1 and 2 and as shown in FIGS. 5 and 6, the machining is effected by means of three cutting tools 11 movable in an anti-clockwise direction and each including a working or leading face 11a and an outer or trailing face 11b which intersect to define a cutting edge 11c.

For proper cutting action the leading face 11a is maintained at an angle of rake of predetermined value, preferably in the range 0° to 20°, a typical value being 6°. Further, the outer or trailing face 11b is relieved at an angle with respect to a tangent drawn to the surface to be machined at the point of contact between the tool and the surface to provide a clearance angle typically in the range 3° to 8°.

In the embodiment illustrated the rake angle and the clearance angle are maintained at constant values during progression of each cutting tool along a path to form a surface such as the surface 1 illustrated in FIGS. 1 and 2.

The cutting tools 11 form parts of tool cartridges 12 which are fixedly secured in any suitable manner in respective tool holders 13.

The tool holders are themselves mounted at positions spaced apart angularly, for example at equal intervals of 120°, on a carrier 14. Each tool holder is pivotally mounted on the carrier in a bearing bush 15 inserted in an aperture in the carrier to provide for rotation of the tool holder about an axis 20 which is normal to the plane of movement of the carrier and tool and passes through at a point on the cutting edge which engages the workpiece, namely the cutting tip of the tool indicated at 11d which in operation will form the point of contact with the workpiece undergoing machining. Each tool holder has a spindle portion 16 terminating in a threaded spigot 17 carrying a nut and lock nut 18 and 19 respectively.

The carrier 14 is constrained to motion in the required mode, for example twin lobed epitrochoidal motion defined by a base body in the form of a circular gear 21 fixed to the body structure 26 of the apparatus and having external peripheral teeth and an orbiting body in the form of an annular gear 22 having internal teeth meshing with the external teeth of the gear 21. The ratio of diameters and numbers of teeth as between the orbiting gear and the base gear is 3 : 2. Drive is transmitted to the carrier to cause it to execute twin lobed epitrochoidal motion from an input or driving dog 23 keyed or otherwise fixed to the shaft 24 or journal portions of an eccentric element and journalled for rotation in a bearing 25 mounted in the body structure 26. The latter is adapted to be clamped or otherwise fixed to a parent machine such as a drilling or boring machine having a driving spindle or arbour adapted to engage and rotatably drive the driving dog 23.

The eccentric element further comprises a crank cheek 28 carrying a crank pin 29 which engages in a bearing bush 30 mounted in an aperture in the carrier and having a throw T with respect to the axis of rotation 24a of the shaft portion 24 equal to the distance between the centres of the orbiting gears 20 and 22.

In order to maintain the cutting tools 11 with their principal working or leading faces 11a and their outer or trailing faces 11b in the predetermined angular relation to the path of movement which these tools follow, a guide means 31 is provided having arms 32 formed with open-ended slots with the inner and outer edges 33, 34 of the limbs on each side of the slots forming guideways spaced equi-distantly on opposite sides of a medial reference axis 35 passing through instantaneous centre 36 about which the oribiting gear meshes or rolls with respect to the base gear.

Each arm is pivoted to a pin 36a coaxial with the instantaneous centre 36 and projecting from a driving plate 36b secured to the end of the crank pin 29 by machine screws such as 37. The plate 36b is keyed with respect to the crank pin by a key 38 engaging in a keyway formed in a spigot 39 coaxial with the axis 40 of the crank pin.

The direction of motion of each cutting edge 11c at any given instant is in an arc defined by rotation of a radius arm coincident with the associated reference axis 35 and struck from the instantaneous centre 36 and terminating at the tip 11d. Thus, by maintaining an angularly fixed relation between the holder of each cutting tool 11 and the associated reference axis 35, constant angular relation is maintained between the working or leading face 11a and the reference axis, and hence the surface of the workpiece undergoing machining in the vicinity of a point contact between the tip 11d and the workpiece.

For this purpose there is provided on each of the tool holders 13 a slide element 13a slidably embracing the associated arm 32. The slide element 13a has passageways for receiving the bifurcated portions or limbs of the arm 32 and the inner and outer boundaries of the passageways are engaged by the inner and outer guide edges 33, 34 of the arms. Consequently each tool holder is maintained in the required angular attitude determined by that of the slot whilst being movable along the slot to allow the tool holder to conform to the mode of motion to which the carrier is constrained.

The carrier 14 is preferably detachably secured as, for example, by machine screws 42 to the orbiting gear 22 and is provided outwardly of the latter with a face 43 carrying an annular seal 44, for example of carbon, engaging in a groove in a ring 45 mounted in an annular channel on the body structure 26. The ring 45 is urged towards the seal 44 by a spring means such as coiled compression springs 47 while being retained against rotation by one or more anchor pins such as 48.

The body structure 26, seal 44, carrier 14 and bushes 30 and 25 define a chamber in which the toothed meshing peripheries of the gears operate and which can be filled with lubricant.

Certain modifications may be made as required in this embodiment. For example, the carrier 14 could be provided with a plurality of sets of bearing openings at different radial distances from the carrier to provide for mounting the bearings 15 at different radial positions or the bearings 15 may be mounted on the carrier in the intermediary of mounting means provided for radial adjustment. Further, the base gear 21 which is releasably secured to the body structure by the machine screws 49 may be replaced by base gear of different diameter and the carrier likewise may be designed to receive orbiting gears 22 of different diameters to enable the apparatus to be utilised to form epitrochoidal surfaces of different sizes and having different numbers of lobes.

The tools 11 may likewise be varied. For example, they may be of a form to act as turning or boring tools as in the embodiment illustrated, axial feed being achieved by utilisation of the axial feed means provided in the parent machine. Alternatively these tools may be of a form designed to perform a honing operation in which case manually or power driven axial feed means may be provided to effect axial reciprocation of the assembly of carrier, driving means, guide means, and tool holders and hence the honing tools.

Figure 7:
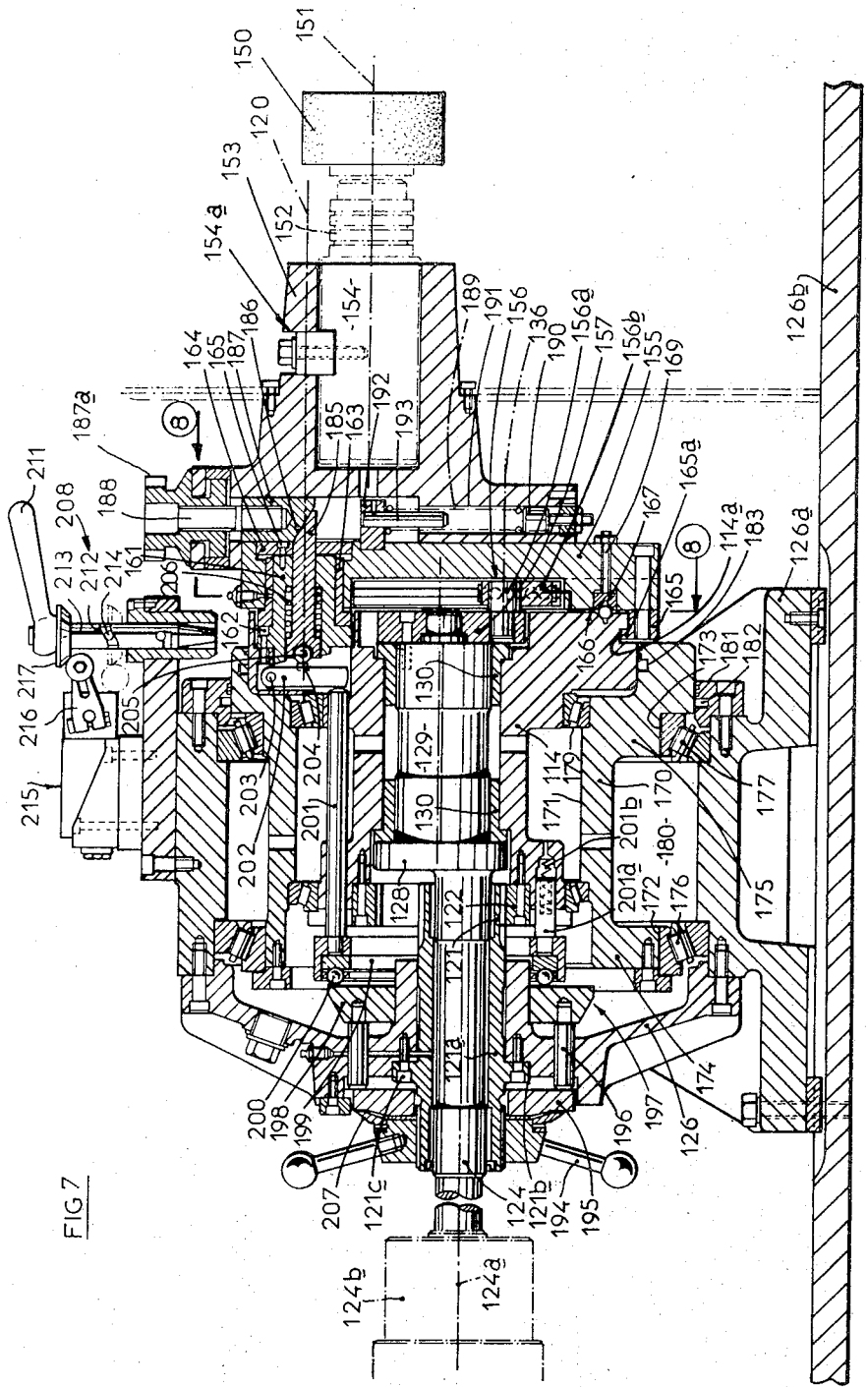
FIG. 7 is a view in side elevation of a further embodiment of apparatus in accordance with the invention for carrying out the method thereof in vertical crosssection on the line 7—7 of FIG. 8.
Figure 8:
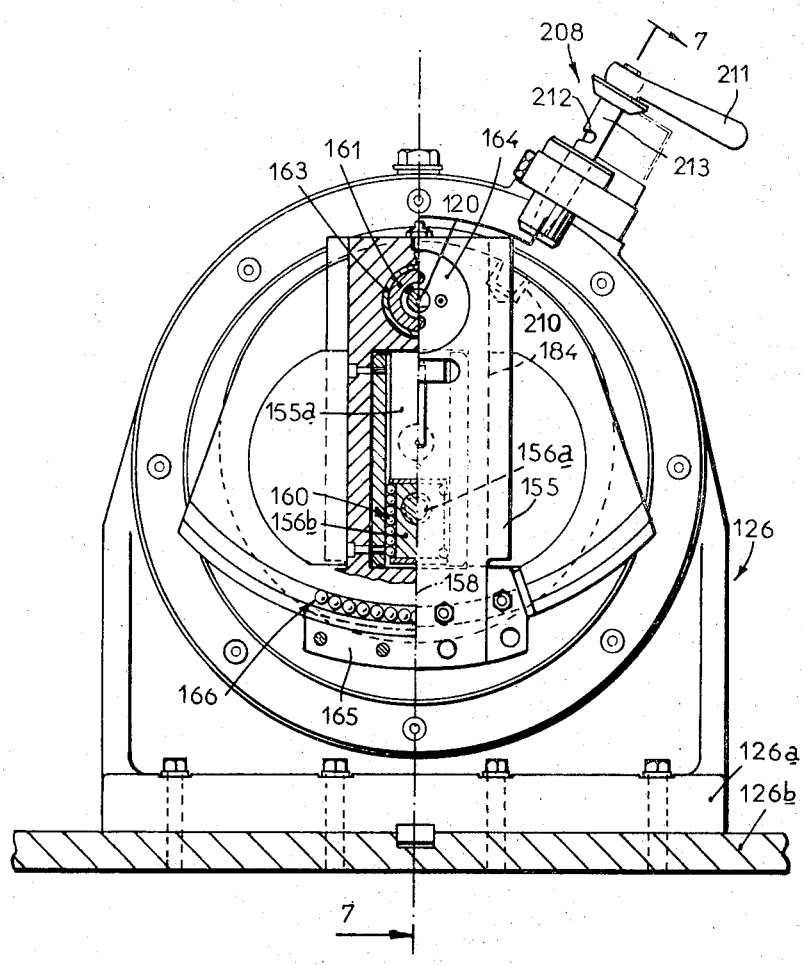
FIG. 8 is a view in end elevation of the apparatus of FIG. 7, one half being in section on the line 8—8 of FIG. 7 and the other half being in end elevation with the tool holder removed.

Referring now to the embodiment of apparatus illustrated in FIGS. 7 and 8 utilising a rotary machining tool, for example a grinding wheel, certain parts of this apparatus are functionally equivalent to those of the embodiment illustrated in FIGS. 5 and 6 and these parts are designated by like reference numerals with the prefix 1 to which the preceding description of the corresponding part is, therefore, deemed to apply. In the following description only a brief reference will, therefore, be made to these functionally equivalent parts.

The rotary cutting tool may, as illustrated, be a grinding wheel 150 mounted for rotation about an axis 151 on a spindle to which is fixed a pulley 152 and releasably supported in a housing 153 forming the tool holder by means of a supporting bearing 154 accommodated in a bore in the tool holder 153 and secured therein by a clamping device 154a.

The tool holder 153, and the grinding wheel therewith is moved along the required path, for example a twin lobed epitrochoidal path 1 as illustrated in FIGS. 3 and 4 by motion imparted to a carrier 114.

In order, however, to maintain the required geometrical relationship between the point of contact of the grinding wheel with the surface of the workpiece, the centre of rotation of the grinding wheel, and the instantaneous centre of the motion derived from the carrier, the tool holder 153 is supported from the carrier through the intermediary of a guide means in the form of a swinging plate 155. As hereinafter described the swinging plate can pivot about an axis 120 which is normal to the plane of movement of the carrier and passes through the point of contact between the grinding wheel and the surface of the workpiece.

As shown in FIG. 8 the radially outwardly presented peripheral face of the grinding wheel which forms its working face projects radially outwardly of the axis 120 to a small extent representing the depth of cut produced by the grinding wheel. References herein to coincidence between the axis about which the tool holder, whether carrying a rotary or non-rotary cutting tool, can pivot and the point of engagement between the tool and the surface of the workpiece are to be deemed to include departures from exact coincidence of the order of the depth of cut which the tool makes in operating upon the surface of the workpiece.

As in the preceding embodiment, the carrier 114 is constrained to motion in a mode determined by the meshing of a base body in the form of an externally toothed gear or pinion 121 meshing with an internally annular gear 122 secured to the carrier 114.

The base gear 121 has an integral sleeve-like extension 121a including a flange 121b which is pinned to the body structure 126 by machine screws 121c.

Drive for the carrier 114 is by way of a driving shaft portion 124 of an eccentric element operatively connected with any suitable motor such as 124b or the driving member of a parent machine. In the latter case a base element 126a of the body structure would be secured to a bed plate or other suitable portion 126b of the parent machine.

Integral with the driving shaft portion 124 is a crank cheek 128 and an eccentric portion or crank pin 129 which drives the carrier through the intermediary of bearing bushes 130.

The required angular movement of the swinging plate 155 relatively to the carrier is brought about through engagement between the guide means and the assembly of carrier, drive means and tool holder at two locations. At one of these a centering element 156 which has a pin portion 156a fitting tightly in an opening in a drive plate 157 secured to the end of the crank pin 129 and the pin portion engaging rotatably in an opening in a slide portion 156b movable along a guideway in the form of a slot 155a formed in the swinging plate 155. The centre line 158 of the slot passes through the axis 120 and the lateral boundaries of the slot are parallel to, and equi-distant from, the centre line 158 and form the guide surfaces which cooperate with the slide portion 156b through the intermediary of linear ball races 160.

The other location is constituted by a pivotal connection between the swinging plate and the carrier about the axis 120. To this end a fixed bearing bush 161 is secured by its flange through machine screws 162 in a chamber formed in the carrier 114, and a movable bearing bush 163 assembled concentrically with the bush 161 and engaging in an opening in the swinging plate, the latter being retained against axial withdrawal by a retainer plate 164 secured by machine screws 165 to the fixed bush 161.

Engagement at these two locations between the swinging plate and the assembly of carrier, drive means and tool holder ensures that the swinging plate occupies the required angular position at any given stage in the cycle of movement of the carrier while accommodating the charging distance between these two locations by virtue of the ability of the slide portion 156b to move along the guideway.

At the lower boundary of the swinging plate as seen in FIGS. 7 and 8, it is interlocked axially with the carrier 114 by means of a rib element 165 of arcuate form having a flange 165a engaging in an arcuate channel 114a in the carrier.

Thrust loads exerted on the grinding wheel 150 in a direction from right to left as seen in FIG. 7, and transmitted through the tool holder 156 to the swinging plate 155, are borne by a ball race 166 in which the balls are seated in arcuate grooves formed respectively in the carrier 114 and in a race element 167 seated in a channel in the plate 155 and adjustable axially lengthwise of the channel by an adjusting screw 169.

The carrier itself is supported for movement within the body structure 126 in the mode already described through an intermediate sleeve element 170 having an internal bore 171 which is eccentric with respect to the peripheral faces 172, 173 of axially spaced flanges 174, 175, roller bearings 176, 177 and 178, 179 are provided respectively between the body structure and the sleeve 170 and the carrier and the sleeve 170, the latter being freely rotatable within the body structure when the carrier is driven by the crank pin 129.

The chamber 180 afforded by the body structure and containing the carrier, base and orbiting bodies, eccentric element and intermediate sleeve is sealed by means of a sealing structure comprising an annular member 181 secured to the body structure and having a sealing element 182 seated in an internal groove engaging an external peripheral face of the intermediate sleeve 170. A further similar sealing element 183 is provided between the sleeve 170 and the carrier 114.

The tool holder 153 is mounted on the swinging plate for radial adjustment lengthwise of the centre line 158 of the guideway formed by the slot in the swinging plate.

For this purpose the swinging plate has slideways such as 184 extending parallel to the lateral boundaries of the tool holder 153 and the latter has complementary slide portions engaging in such slideways. The position of the tool holder longitudinally of the slideways is controlled by a cam rod 185 terminating in a plane bevelled face 186 and mounted for endwise movement in the fixed bush 161. An adjustable follower rod 187 having a complementary plane bevelled face cooperates with the face 186 and is adjustable endwise in the tool holder to provide coarse adjustment of the position thereof by means of a rotary knob 187a fixed to a screw-threaded spindle 188 engaging in an internally threaded bore in the follower 187.

The bevelled faces of the cam rod and follower are maintained in contact by a coiled compression spring 189 acting between an adjustable thrust block 190 in the lower end of a bore 191 in the tool holder, and an abutment block 192 projecting from the swinging plate and carrying a guide rod 193 extending axially into the interior of the spring.

Fine adjustment of the position of the tool holder (and hence the depth of cut produced by the grinding wheel) is effected by endwise movement of the cam rod 185 brought about by rotation of the adjusting member 194 mounted rotatably on the (stationary) body structure 126.

Rotation of the adjusting member 194 produces axial movement thereof by virtue of screw-threaded engagement with an externally threaded portion of the sleeve extension 121a and this axial movement is transmitted through a thrust plate 195 to angularly spaced thrust rods 196 and thence to a thrust race 197. The latter includes fixed and rotary plates 198, 199 with an intervening ball race 200. Axial movement of the rotary plate 199 is transmitted through push rod 201 to a rocker 202 pivotable about a fixed pin 203 in the carrier 114 and thence by way of a thrust pad 204 to a ball 205 seated in a socket in the adjacent end of the cam rod 185. Contact is maintained between parts 204 and 205 by a coiled compression spring 206 acting between an internal shoulder in the bush 161 and a head at the left-hand end of a cam rod. A "dummy" push rod 201a urged against the plate 199 by a spring 201b provides balanced loading for plate 199.

The adjusting member 194 is preferably provided with a flange 207 which may bear graduations registering with a pointer or datum mark on the body structure and calibrated to indicate the relationship between angular movement of the adjusting member and change in radial position and hence depth of cut of the grinding wheel 150.

To enable the latter to be maintained in a fixed position for dressing after a period of use, a carrier locking device 208 is provided including a spindle 209 having a nose able to enter a socket 210 in the carrier, and movable axially in response to rotation by a handle 211 to the intermediary of a helical slot 212 in a sleeve bearing 213 and a radially projecting pin 214.

The safety interlock, for example in the form of a microswitch 215 operable by a rocker 216 and a flange plate 217 on the spindle, is connected, for example, in the drive motor circuit to prevent the latter being energised when the pin 209 is moved into the socket 210.

Figure 9:
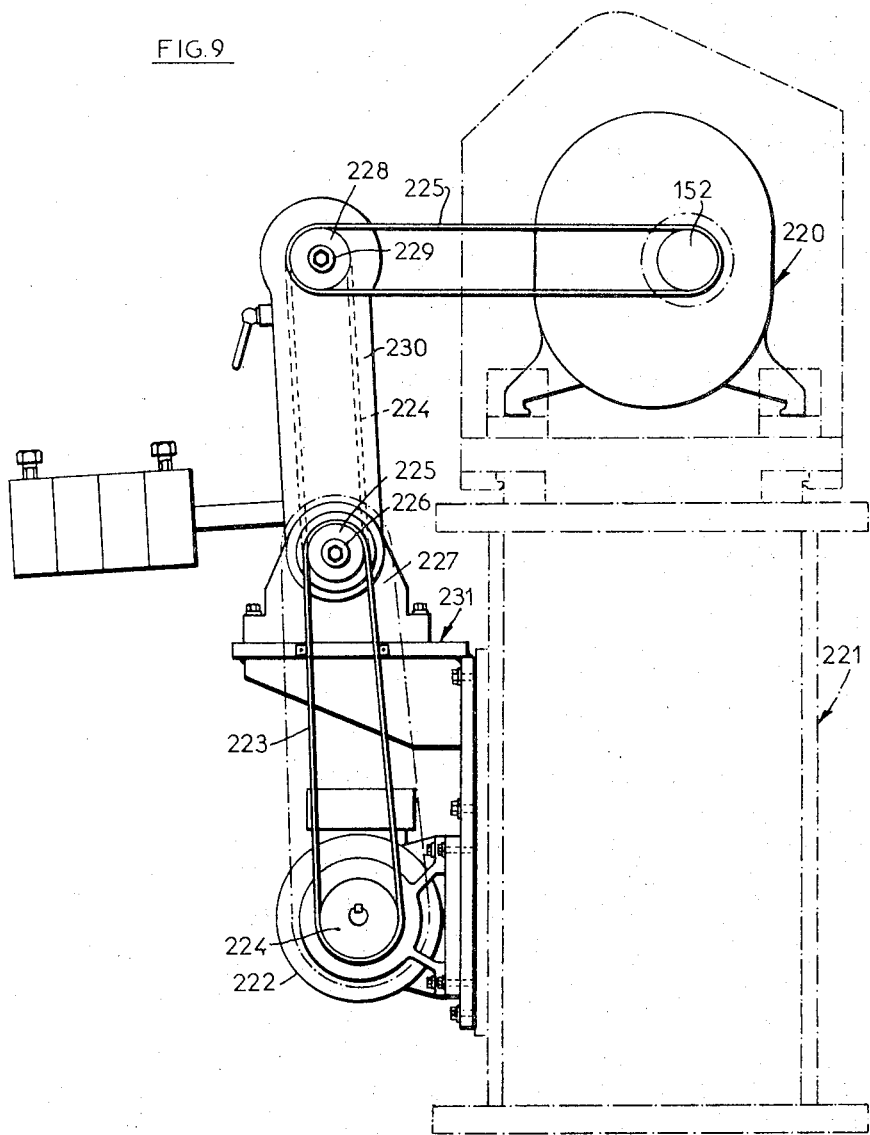
FIG. 9 is a view in end elevation showing one arrangement of a drive means for the rotary machining tool of the embodiment of FIGS. 7 and 8.

Referring now to FIG. 9, this illustrates a suitable arrangement for driving the grinding wheel.

The apparatus of FIGS. 7 and 8 indicated generally at 220 is mounted on a parent machine 221 on which a workpiece support would be movably mounted for axial feed parallel to the axis 120 to engage the workpiece of the grinding wheel.

A driving motor 222 drives the pulley 152 of the grinding wheel through the intermediary of three endless belts 223, 224, 225.

The belt 223 engages around a pulley 224 on the shaft of motor 222 and around one 225 of a pair of pulleys fixed at opposite ends of a spindle 226 journalled rotatably in a bearing structure 227.

The second belt 224 engages around the other of the pulleys 225 and around one of a pair of further pulleys such as 228 fixed at opposite ends of a spindle 229 journalled in a bearing at the upper end of a swinging arm 230 which can swing about the axis of spindle 226.

The bearing structure 227 and the motor 222 may be mounted on respective limbs of an L-shaped bracket 231 secured to any suitable part of the parent machine, for example one side of the machine base as seen in the drawing.

The swinging arm 230 is biased for rotation in an anti-clockwise direction, as seen in FIG. 9, thereby maintains tension in the third belt 225 which passes round the other of the pulleys 238 and the pulley 152 of the grinding wheel.

The arm can swing to accommodate the motion of the grinding wheel determined by the combined motions of the carrier 114 and swinging plate 155.

In will be understood that in any case where it is desired to establish an angular relationship between the path of movement of the tool, whether non-rotating or rotating, and a working face of the tool which varies at different positions along the path of movement traced out by the tool, the embodiments of apparatus already described may be modified to achieve this.

For example, in the apparatus illustrated in FIGS. 5 and 6 the pin 36a on the driving plate 36b could be located in a position in which it is not coincident with the instantaneous centre 36 but is displaced therefrom to a selected extent to bring about the required variation in said angular relationship. Alternatively the pin 36a may be movable radially in a guide slot in the driving plate 36b under the control of an annular cam face cooperating with a follower on the pin.

In the embodiment illustrated in FIGS. 7 and 8 a similar controlled variation from the colinear relationship between the instantaneous centre, the point of engagement of the grinding tool with the workpiece, and the centre of rotation of the grinding tool could be brought about by mounting the centering element 156 at a position in which it is no longer coaxial with the instantaneous centre represented by axis 136, or mounting the pin portion 156a thereof in a radial slot in the plate 157 and controlling the position of this pin portion by an annular cam cooperating with a follower on the pin portion.

In the foregoing specification and claims the expression "working face" of the tool means any face or combination of faces of the tool which control or determine the manner in which metal or material is removed from the workpiece. In the case of a non-rotating tool, the principal working face is the leading face but the outer or trailing face may to some extent influence the manner in which material is removed. In the case of a rotary machining tool in the form of a grinding wheel, the working face is constituted by the radially outwardly presented peripheral face, and in the case of the rotary tool, such as a milling cutter, the working face would be constituted by the toothed peripheral face of the tool, the manner in which metal or material is removed from the workpiece being then determined partly by the positional relationship between the instantaneous centre, the point of engagement between the working face and the workpiece, and the centre of rotation of the tool itself, and partly by the angular relationship between the leading face of each tooth and possibly, to some extent, the outer or trailing face and the path traced out by the tool at the point of engagement between the tool and the workpiece.

The expression "point of engagement" is to be deemed to denote any small area of contact between the working face of the tool and the workpiece, or any line or narrow zone of contact, which latter will occur, for example, in the case of a cylindrical grinding wheel.

I claim:

1. A method of forming a surface on a workpiece by machining comprising:
   a. moving a carrier on which is supported a non-rotating machining tool, having a leading face and a trailing face defining a cutting edge, in a mode defined by rolling without slipping of an orbiting body around a base body such that the orbiting body moves angularly about an instantaneous centre at a point of contact between the bodies to move the tool along a predetermined like path in each complete cycle of movement of the tool,
   b. controlling the angular relationship at a point of engagement of the tool with the workpiece between the path of movement of the tool and a working face of the tool by controllably moving the tool angularly with respect to the carrier in a plane parallel to that in which the carrier moves and about an axis passing through said cutting edge.

2. A method according to claim 1 wherein the controllable angular movement imparted to the tool is such as to maintain a constant angular relationship between the path of movement of the tool and a reference axis drawn from the instantaneous centre to the point of engagement between the tool and the workpiece.

3. Apparatus for forming a machined surface on a workpiece, such apparatus comprising:
   a. a body structure,
   b. carrier means movably mounted on said body structure
   c. a non-rotating machine tool having leading and trailing faces defining a cutting edge and supported from said carrier means for angular movement about an axis passing through said cutting edge
   d. means constraining said carrier means to movement along a path defined by the locus of a point on an orbiting body in rolling non-slipping engagement with a base body and rotatable therearound
   e. drive means for moving said carrier means along said path, and
   f. means for controllably varying the angular relationship about said axis between said tool and said carrier means in a plane parallel to that in which said carrier means is moved and during movement of said carrier means along said path.

4. Apparatus according to claim 3 wherein said means for controlling the angular relationship between said tool holder means and said carrier means provides constant angular relation between said leading face of said tool and a reference axis passing through a moving instantaneous centre of rotation of said carrier means defined by a point of contact between said base body and said orbiting body, and also passing through said cutting edge.

5. Apparatus according to claim 3 wherein:
   a. said body structure defines a chamber containing said means for constraining said carrier means to said movement and containing said drive means,
   b. said chamber has an open end from which said carrier means projects and on which said tool is mounted,
   c. sealing means are provided between said body structure and said carrier means to retain lubricant in said chamber.

6. Apparatus for forming a machined surface on a workpiece, such apparatus comprising:
   a. a body structure,
   b. carrier means mounted on said body structure for orbital movement in a plane,
   c. tool holder means for supporting a non-rotatable machining tool having leading and trailing faces defining a cutting edge and operatively connected with said carrier means to be movable angularly about an axis normal to said plane of movement of said carrier means and passing through said cutting edge,
   d. means constraining said carrier means to movement in said plane along a trochoidal path defined by the locus of a point on a circular orbiting body rolling without slipping around a circular base body of a diameter such that the trochoidal path has lobes in fixed positions relative to said base body,
   e. drive means for moving said carrier means along said path,
   f. a guide member operatively associated with the assembly of carrier means, drive means and tool holder means to be moved orbitally therewith but itself angularly positioned relatively to said assembly by engagement with said assembly through
  i. pivot means connecting said guide member with said drive means and coaxial with a moving instantaneous centre defined by the point of contact between said base and orbiting bodies,
  ii. guideway and slide means connecting said guide member with said tool holder means.

7. Apparatus according to claim 6 wherein:
  a. a plurality of said tool holder means are provided at positions spaced apart along the path of tool movement
  b. said guide member has correspondingly spaced guideways engaged with respective slide means associated with respective ones of said tool holder means.

8. Apparatus according to claim 7 wherein:
  a. said guide member includes arms radiating from said instantaneous centre,
  b. said arms have guideways at their outer ends extending longitudinally of said arms and engaging slide means on respective ones of said tool holder means.

9. Apparatus for forming a machined surface on a workpiece element by means of a tool element, such apparatus comprising:
  a. a body structure,
  b. carrier means mounted on said body structure for orbital movement in a plane,
  c. holder means for supporting one of said elements and operatively connected with said carrier means to be movable angularly in relation thereto about an axis normal to said plane of movement of said carrier means, and passing through a point of engagement between said elements when said apparatus is in use,
  d. constraining means for constraining said carrier means to movement in said plane along a trochoidal path defined by the locus of a point on a circular orbiting body rolling without slipping around a circular base body of a diameter such that the trochoidal path has lobes in fixed positions relative to said base body,
  e. drive means for moving said carrier means along said path,
  f. support means operatively interposed between said carrier means and said body and affording freedom for said carrier means to move along said path as determined by said constraining means while independently transmitting load reaction arising from engagement between said tool and workpiece elements from said carrier means to said body,
  g. guide means for controlling the angular position of said holder means about said axis to maintain a predetermined angular relation between contacting faces of said tool and workpiece elements as said carrier means moves along said path.

10. Apparatus according to claim 9 wherein:
  a. said holder means support a rotatable cutting tool having radially outwardly presented working face concentric with a tool centre of said tool about which it is rotated,
  b. drive means are provided for rotating said tool,
  c. said holder means is mounted on said carrier means through the intermediary of a guide member,
  d. said guide member is engaged with said carrier means through pivot means substantially coaxial with an axis passing through the point of engagement between the tool and the workpiece,
  e. said guide member is further engaged with said means through guideway and slide means providing for relative sliding movement between said guide member and said means parallel to a line passing through said point of engagement and through a moving instantaneous centre defined by the point of contact between said base and orbiting bodies and providing for relative angular movement about an axis normal to said plane of movement of said carrier means and passing through said instantaneous centre.

11. Apparatus according to claim 10 further including a bearing means incorporating roller bearings interposed operatively between said guideway means and said slide means.

12. Apparatus according to claim 10 further including a thrust bearing incorporating roller means interposed between said carrier means and said guide member for bearing axial loads in response to engagement between said rotary tool and said workpiece.

13. Apparatus according to claim 9 wherein:
  a. said body structure affords a chamber,
  b. said carrier means includes at least a portion received in said chamber for movement therein as determined by said constraining means,
  c. said supporting means is mounted in said chamber between an interior surface thereof and said portion of said carrier means.

14. Apparatus according to claim 13 wherein said supporting means includes:
  a. inner parts supportively engaging said portion of said carrier means at positions spaced apart in a direction normal to said plane of orbital movement,
  b. outer parts supportively engaged with said interior surface of said chamber at positions spaced apart along the last said direction.

15. Apparatus according to claim 9 wherein said supporting means comprises:
  a. sleeve means interposed between said body structure and said carrier means,
  b. bearing means providing for relative rotation interposed between said sleeve means and said body structure,
  c. further bearing means eccentric to the first said bearing means by a distance to accommodate said movement of said carrier means and interposed between said sleeve means and said carrier means.

16. Apparatus according to claim 9 wherein:
  a. said body structure affords a chamber open at one end,
  b. said supporting means comprises:
    i. outer bearing elements spaced apart longitudinally of said chamber and engaging at their exterior faces with the interior face of said chamber,
    ii. a sleeve element having an exterior face engaged with the interior faces of said outer bearing elements and having an interior face eccentric with its exterior face,
    iii. inner bearing elements in said sleeve element spaced apart longitudinally thereof and engaging at their exterior faces with said interior face of said sleeve element, c. said carrier means includes at least a portion received within and supported by the interior faces of said inner bearing elements, d. said base and orbiting bodies of said constraining means are mounted in said chamber with said base body coaxial with said interior surface of said chamber and said orbiting body secured to said portion of said carrier means, e. said driving means comprises a driving shaft portion co-axial with said base body, and an eccentric portion extending into the interior of said portion of said carrier means and having an eccentric throw corresponding to that existing between said interior and exterior faces of said sleeve element, f. said holder means and said guide means are mounted on said carrier means adjacent to said open end of said chamber.

17. Apparatus according to claim 16 wherein a. said body structure includes a portion closing the other end of said chamber, b. sealing means are provided between said body structure and said sleeve element, and further sealing means are provided between said carrier means and said sleeve element effectively to seal said chamber against egress of lubricant therefrom.

18. Apparatus for forming a machined surface on a workpiece element by means of a tool element, such apparatus comprising a. a body structure affording a chamber open at one end b. carrier means having at least a portion extending into said chamber said carrier means being mounted for orbital movement in a plane c. holder means for supporting one of said elements d. means operatively connecting said holder means with said carrier means in a manner to be movable angularly in relation thereto about an axis normal to said plane of movement of said carrier means, and passing through a point of engagement between said elements when said apparatus is in use, e. constraining means for constraining said carrier means to movement in said plane along a trochoidal path defined by the locus of a point on a circular orbiting body rolling without slipping around a circular base body of a diameter such that the trochoidal path has lobes in fixed positions relative to said base body, f. drive means for moving said carrier means along said path g. adjustment means associated operatively with said holder means for positionally adjusting said holder means relatively to said axis in a direction to vary the depth of cut as between said tool and workpiece elements h. operating means mounted on a stationary portion of said body structure for operating said adjustment means i. transmission means operatively connecting said operating means with said adjustment means while accommodating said movement of said carrier means and holder means thereon during operation of the apparatus.

19. Apparatus according to claim 18 wherein a. means operatively connecting said holder means with an assembly comprising said drive means and said carrier means comprises a guide member connected with said carrier means through:
   i. pivot means at a location substantially coaxial with said point of engagement between said tool and workpiece elements
   ii. guideway and slide means at a further location coaxial with a moving instantaneous center between said base body and said orbiting body b. said adjustment means is mounted on said pivot means for positionally adjusting said holder means in a direction parallel to a line joining said locations.

20. Apparatus according to claim 19 wherein:

a. said adjustment means comprises an element movable coaxially of said pivot means, b. said transmission means comprises
   i. a part movable orbitally with said carrier means and engaging said element of said adjustment means,
   ii. a part mounted on said body structure and constrained against orbital movement with said carrier means but movable normal to the plane of orbital movement,
   iii. thrust base means operatively interposed between said parts of said transmission means.

* * * * *

UNITED STATES PATENT OFFICE
CERTIFICATE OF CORRECTION

Patent No. 3,823,626        Dated July 16th, 1974

Inventor(s) John Bakewell

It is certified that error appears in the above-identified patent and that said Letters Patent are hereby corrected as shown below:

In the heading of the patent, line 4, change "Transmission" to --Transmissions--;

Column 1, line 50, change "link" to --like--;

Column 6, line 42, after "point" insert --of--;

Column 10, line 57, change "In" to --It--;

Column 12, line 10, change "machine" to --machining--.

Signed and sealed this 29th day of October 1974.

(SEAL)
Attest:

McCOY M. GIBSON JR.
Attesting Officer

C. MARSHALL DANN
Commissioner of Patents